United States Patent [19]
Marshall

[11] Patent Number: 5,193,659
[45] Date of Patent: Mar. 16, 1993

[54] CONVEYOR

[75] Inventor: Adrian R. Marshall, Chinnor, Great Britain

[73] Assignee: Ranks Hovis Mcdougall PLC, Berkshire, England

[21] Appl. No.: 894,261

[22] Filed: Jun. 8, 1992

[30] Foreign Application Priority Data

Dec. 7, 1989 [GB] United Kingdom ............... 8927692

[51] Int. Cl.⁵ ............................................. B65G 47/26
[52] U.S. Cl. ................................. 198/419.2; 198/783; 198/784
[58] Field of Search ..................... 198/419.2, 461, 783, 198/784

[56] References Cited

U.S. PATENT DOCUMENTS

| | | | |
|---|---|---|---|
| 1,728,538 | 9/1929 | Gentil et al. | 198/784 |
| 3,187,873 | 6/1965 | Wolf | 198/461 |
| 3,254,778 | 6/1966 | Marland et al. | 198/784 |
| 3,759,188 | 9/1973 | Woods | 104/198 |
| 3,992,182 | 11/1976 | Frank | 198/461 |
| 4,341,334 | 7/1982 | Bier | 198/419.2 |
| 4,781,286 | 11/1988 | Weaver | 198/310 |

FOREIGN PATENT DOCUMENTS

| | | |
|---|---|---|
| 0187424A1 | 1/1985 | European Pat. Off. . |
| 0290215A1 | 5/1988 | European Pat. Off. . |
| 2547406A1 | 4/1977 | Fed. Rep. of Germany . |
| 3128183A1 | 5/1982 | Fed. Rep. of Germany . |
| 1362346 | 4/1964 | France . |

OTHER PUBLICATIONS

International Application Published Under the Patent Cooperation Treaty (PCT) International Publication No. WO 91/08971; International Publication Date Jun. 27, 1991.

Primary Examiner—Joseph E. Valenza
Attorney, Agent, or Firm—Darby & Darby

[57] ABSTRACT

A conveyor for arranging articles (9) which comprises a plurality of rollers (5) arranged side-by-side and means for rotating the rollers such that each roller can be rotated at a different rate from rollers adjacent to it. By appropriate selection of the rate of rotation of the rollers of the conveyor, articles supplied to the conveyor randomly can be arranged, for example aligned in rows (10).

14 Claims, 4 Drawing Sheets

CONVEYOR

This is a continuation of application Ser. No. PCT/GB90/01914, filed Dec. 7, 1990.

This invention relates to a conveyor which can be used to arrange articles randomly disposed articles on the conveyor, so that when the articles are removed from the conveyor, they are appropriately arranged, for example in uniformly spaced rows. The invention also relates to a method of arranging articles.

It can be desirable to arrange articles in the course of movement along a conveyor in order to facilitate packing, handling and other subsequent processing operations. Articles can be disposed on a conveyor randomly at its infeed end, and it can be desirable to arrange them, for example by separating, aligning or grouping the articles, before they are removed from the outfeed end.

Articles can be arranged on a conveyor which comprises free-running rollers by collision. For example, articles can be aligned in rows by collision with a straight object such as a rod or bar. A disadvantage of such an aligning technique is that it can lead to damage of the articles. For example, articles which are formed from a frangible material can break on such collision. Articles formed from a material which is susceptible to bruising can also be damaged. Collisions between articles can also be undesirable in cases of articles which might tend undesirably to stick to one another on contact, or which might lead to cross-contamination of the articles on collision.

The present invention provides a technique for arranging articles on a conveyor without collision between each articles or another object.

In one aspect, the invention provides a conveyor for arranging articles, having an infeed end at which articles may be placed on the conveyor and an outfeed end from which articles may be removed from the conveyor, the conveyor comprising:

(a) a plurality of rollers arranged side-by-side;

(b) means for rotating the rollers so that each roller can be rotated at a rate which is different from the rate of rotation of adjacent rollers; and (c) means for controlling the rates at which the rollers rotate so that a high rotational rate region of the conveyor, in which one or more rollers rotate at a higher rate than adjacent rollers, moves from a first end of the conveyor towards a second end.

In another aspect, the invention provides a method of arranging articles which comprises:

(a) placing the articles on a conveyor at its infeed end, the conveyor comprising:

(i) a plurality of rollers arranged side-by-side, the spacing between the rollers being such that an article on the conveyor contacts at least two rollers, (ii) means for rotating the rollers so that each roller can be rotated at a different rate from rollers adjacent to it, and (iii) means for controlling the rates at which the rollers rotate so that a high rotational rate region of the conveyor, in which one or more rollers rotate at a higher rate than adjacent rollers, moves from a first end of the conveyor towards a second end; and (b) removing the arranged articles from the outfeed end of the conveyor.

It has been found surprisingly that articles can be arranged, for example involving separation, aligning or grouping, by appropriate arrangement of relative rotation rates of a plurality of rollers. The technique of the invention allows articles to be arranged without collision between articles or between each article and another object. The technique of the invention is therefore particularly well suited to the arrangement of fragile articles, which might be liable to break or to bruise on collision, and of articles which might tend to stick to one another on collision. Examples of such articles include foodstuffs such as pies, cakes, confectionery, fruit, vegetables and so on, breakable articles such as crockery and glassware, articles which can be contaminated such as materials for chemical reaction produced by chemical reaction, articles to which a fluid has been applied for drying such as painted or printed articles, and so on. Other applications in which articles need to be arranged for example between batch and continuous processes, will be apparent.

The velocity with which the region of high rotation rate rollers moves along the conveyor will be between the approximate maximum and minimum speeds at which the surfaces of the rollers move. The surface speed of a roller at a point along its length is given by the product of the perimeter dimension of the roller at that point and the rate at which the roller rotates. When a roller has a cross-section which changes along its length, the relevant surface speeds will be those at regions of the roller which are contacted by articles placed upon it when the conveyor is in use. For purpose of assessing minimum and maximum surface speeds of rollers, deviations in the variations of individual rollers (for example in which a rotation rate is increased or decreased sharply over a short period of time, or in which one roller rotates consistently (slower or quicker than its neighbouring rollers) can be disregarded.

Generally, the high rotation rate region moves from the infeed end of the conveyor towards the outfeed end.

The invention finds particular application in the alignment of articles such as pies and cakes for subsequent packaging, in which individual articles are placed in moulded plastic trays which are provided with appropriate recesses. Such articles are generally produced by a substantially continuous process from which articles are supplied randomly. It is desirable to arrange the articles into rows for packaging, and to do so with minimum damage which can arise for example due to collision.

A further advantage of the technique of the present invention is that, by appropriate arrangement of the relative rotation rates of the rollers, the way in which articles are arranged on the conveyor can be adapted to suit the requirements of a particular application. For example, when articles are to be aligned in rows, adjustment of the relative rotation rates can change the spacing between the aligned rows of articles. The selection of a desired arrangement of articles can be made conveniently by appropriate adjustment of the control means, and without substitution of any items of hardware. Generally, the relative rotation rates of the rollers will be determined mathematically. It is convenient for the rotation rates to be controlled using appropriately programmed computer equipment.

Preferably, the rate of rotation of each of the rollers varies cyclically with time. The rate of rotation of a roller will vary between rates above and below a mean rate. Generally, the rate of rotation will vary approximately sinusoidally with time. However, it can be desirable in some applications to arrange for the rate of rotation to be held fixed for a portion of the cycle, thus imparting a deviation from a true sinusoidal cycle. Other deviations might be provided by, for example, introducing a spike in which the rate of rotation is increased or decreased sharply over a short period of time. Such variations in rotation rate can serve to stabilise articles in a desired arrangement, or to destabilise articles from an arrangement which is not desired.

Changes in the rate of rotation of a roller may be made continuously. Alternatively, changes in the rate of rotation may be carried out in a stepwise fashion.

Preferably, the pattern of cyclical variation of the rotation rate of any of the rollers is approximately the same as the pattern of cyclical variation of rotation rates of the other rollers, the cycles for adjacent rollers being out of phase. For example, the cycles of adjacent rollers may be out of phase by between 20° and 60°, preferably about 45° so that a cycle is represented by eight adjacent rollers. Such an arrangement of rotation rates allows articles conveniently to be aligned in rows, and can simplify the required pattern of rotation rates when the control means is set up.

For some applications, the pattern of cyclical variation of the rotation rate of at least one of the rollers is different from the pattern of cyclical variation of one or more of the other rollers. The variations in the pattern can be minor, for example, involving the introduction of spike as discussed above. However, major differences in the pattern can be useful in some applications. For example, a relatively slow roller or a relatively fast roller can be included in order to turn an elongate article so that it is appropriately aligned relative to the direction of movement of the article.

For many applications, the rollers will be provided with a generally uniform cross-section along their lengths. However, it can be advantageous for some applications to use one or more rollers in the conveyor which have a nonuniform cross-section along their length. For example, one or more rollers may have a region of greater or lesser diameter along their length imparting a barrel-shaped or waisted configuration to the rollers. Such a configuration can serve to arrange articles in a desired configuration transversely of the conveyor. The technique of the present invention can therefore be used to arrange articles in a desired two dimensional array.

The means for rotating the rollers may be provided in the form of an electric motor. Each of the rollers may be provided with means for rotating it which is independent of that provided for other rollers. This has the advantage of allowing the rotation rates of individual rollers to be varied independently. Alternatively, two or more rollers may be rotated by a single rotating means, the rollers being spaced apart along the conveyor. For example, two or more rollers may be rotated by means of a single electric motor, the rollers being linked to one another, for example by means of a belt or chain or by gears.

In a preferred embodiment, a roller may be rotated by means of an appropriate rotational drive (for example an electric motor) to which it is connected by means of an appropriate link such as a belt or chain. The drive may rotate at a constant speed. The roller is provided with a tapered portion against which the link acts. The position at which the link acts on the conical portion of the roller is variable along the length of that conical portion so that, in effect, the diameter of the roller at the point at which it contacts the link varies. As a result, when the link contacts a large diameter portion of the roller, the rate of rotation of the roller is relatively low; when the link contacts a small diameter portion of the roller, the rate of rotation of the roller is relatively high. A single link may be used to drive more than one roller by appropriate routing of the link. A preferred form of link for use in this embodiment may take the form of a belt, on which means for engaging the tapered portion of the roller(s) is provided arranged across the width of the belt. For example, an embossed trace made of a suitably tacky material (for example, a silicone rubber) may be embossed on a belt, for contacting a polished tapered portion of the roller(s) (for example, formed from stainless steel).

The surfaces of the rollers which contact the articles may be cushioned to minimise damage caused to the articles on contact.

The conveyor of the invention may include a sheet-like surface having openings in it through which the rollers can contact the articles. The use of such a surface can reduce damage to the articles while they are being arranged.

The conveyor of the invention may form part of a conveyor system, which includes a plurality of conveyors. In addition to the conveyor of the invention, the system, may include one or more conveyors which comprises a plurality of rollers, or one or more conveyors which comprises a moving belt, or both. The axes along which articles move along each of the conveyors of the system may be aligned. However, a system of conveyors with non-aligned axes can be used to move articles around a corner.

A system which comprises a first conveyor according this invention, and a second conveyor (which might also be a conveyor according to this invention) on which articles are deposited, the axes of the conveyors being non-aligned, has particular advantages. The first conveyor can be used to arrange articles in a two dimensional array, for example of rows and columns. The articles which make up the array can be split into groups, for example for packaging. For example, three articles in each of two adjacent rows extending perpendicular to the axis of the conveyor can be considered as a group of six articles for packaging. The second conveyor can be used to group articles in other arrangements by taking articles in other rows from the array, those rows being at an angle other than perpendicular to the axis of the first conveyor. This system of conveyors therefore makes it possible for articles placed on the first conveyor in a first arrangement (for example from packages which contain six articles) can be arranged for removal from the second conveyor in a second arrangement (for example for repackaging in groups of five articles).

The spacing of the rollers is such that an article on the conveyor contacts at least two rollers. It has been found that this is necessary for the articles to be arranged as desired. Preferably, the rollers are arranged so that the length of the articles arranged on the conveyor is at least twice the pitch of the rollers. This allows each article to contact three rollers. Preferably, the conveyor is sufficiently long and contains enough rollers for it to include at least two regions in which one more more rollers rotate at a higher rate than adjacent rollers. The distance between such regions is preferably greater than twice the length of the articles which are arranged on the conveyor.

Where reference is made to the length of an article in connection with dimensions of the conveyor and components thereof, the length is generally to be measured in the direction in which articles are moved along the conveyor. When non-round articles are to be arranged, they may be placed on the conveyor with their longest dimension or their shortest dimension aligned with the direction of movement along the conveyor, or perpendicular to that direction, provided that each article contacts at least two adjacent rollers of the conveyor, and is not too long relative to the distance between adjacent regions in which one or more rollers rotates at a higher rate than adjacent rollers. Elongate articles may be oriented on the conveyor by arrangement of the rotation rates to provide a relatively slow roller or a relatively fast roller.

The invention will now be described by way of example with reference to the accompanying drawings, in which.

Figure 1:
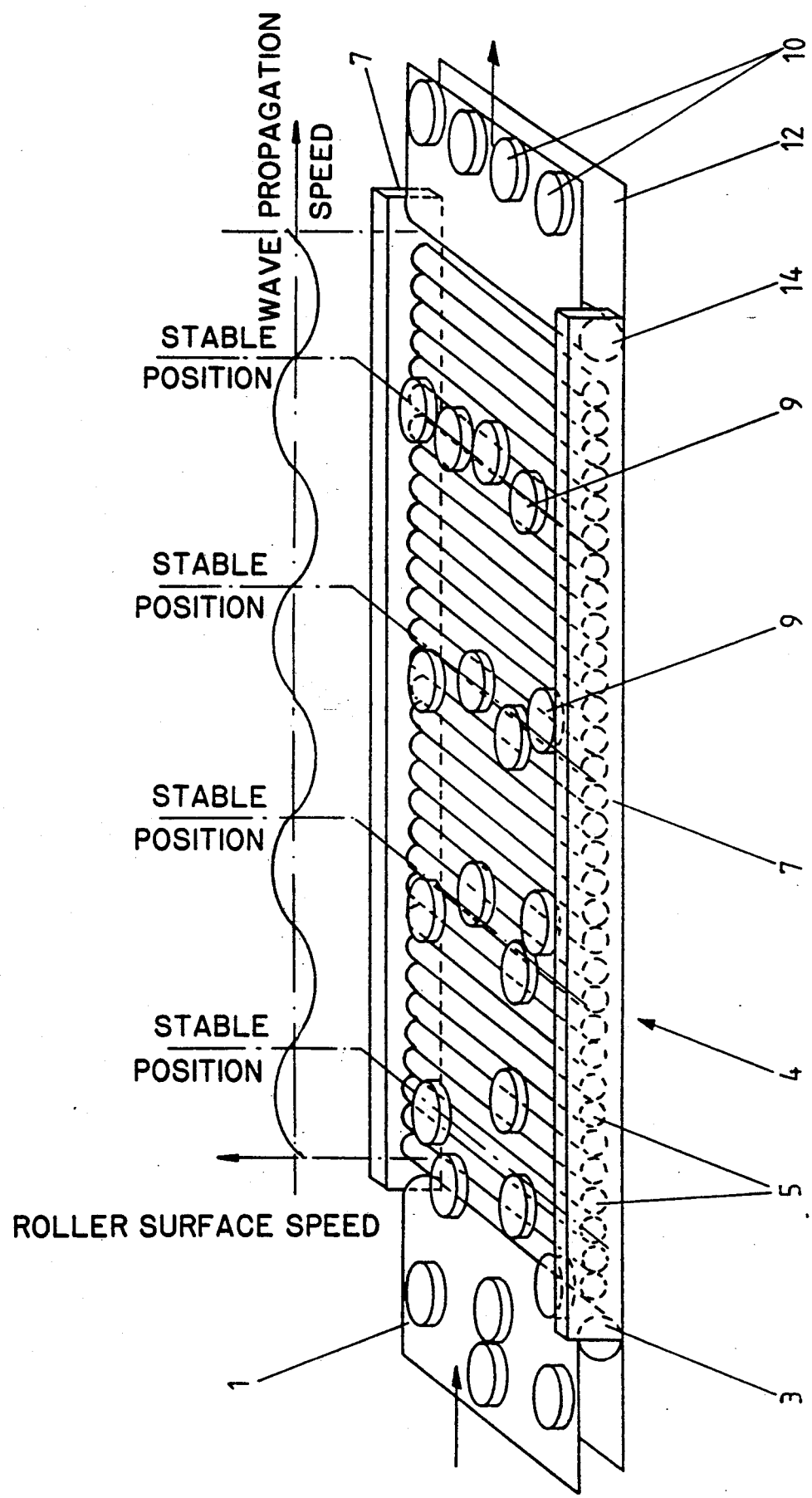
FIG. 1 is an isometric view of a portion of conveyor system.

Referring to the drawings, the apparatus shown in FIG. 1 comprises a fixed speed conveyor belt 1 which is driven by a roller 3 adjacent to the infeed end of a multi-roller conveyor 4. The conveyor 4 comprises a plurality of rollers 5 arranged side-by-side. Each of the rollers 5 is driven independently by its respective electric motor (not shown), the motors driving adjacent rollers being provided at opposite sides of the conveyor. The motors are located inside a housing 7.

The apparatus further includes a conveyor belt 12 which passes around a roller 14. The conveyor belt 12 receives articles from the conveyor 4 at the outfeed end thereof.

Power supplied to the motors which drive the rollers 5 is controlled in such a way that the rate of rotation of each of the rollers 5 varies. The variation of rotation speed is shown schematically in FIG. 1. It can be seen that every eight roller rotates at a maximum rate, and there exists a position a short distance in front of the maximum rotation rate roller (labelled "stable position") at which articles placed on the conveyor tend to collect in rows indicated generally by the numeral 9. The regions of high rotational rate and of low rotational rate respectively move along the conveyor in a direction from the infeed end at which articles are supplied from the conveyor belt 1 towards the outfeed end at which articles are removed by means of the conveyor belt 12. As a result, rows of aligned articles 10 are removed by the belt 12.

Figure 2:
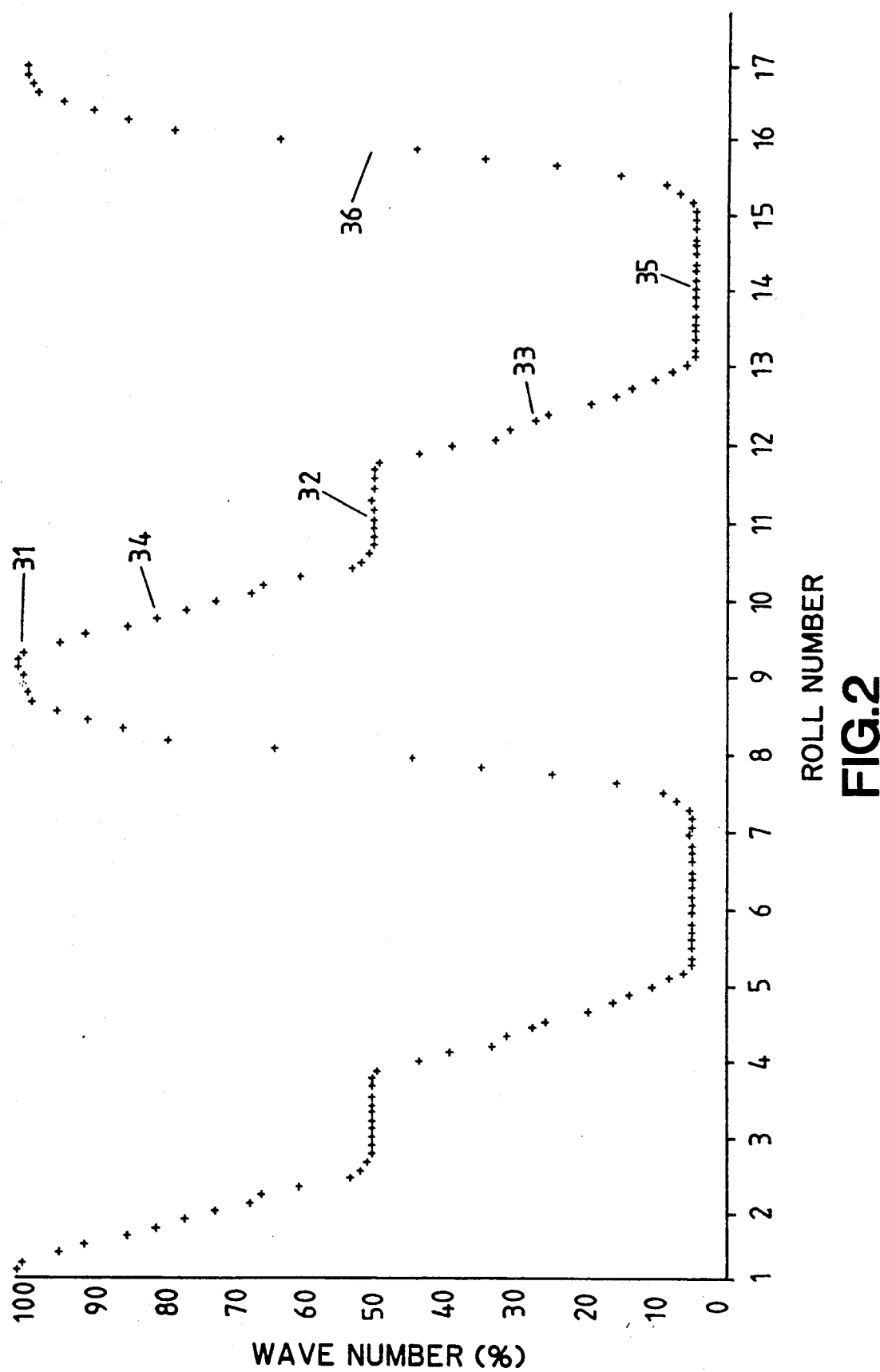
FIG. 2 shows how the rate of rotation varies along the array of rollers of a conveyor.
Figure 3:
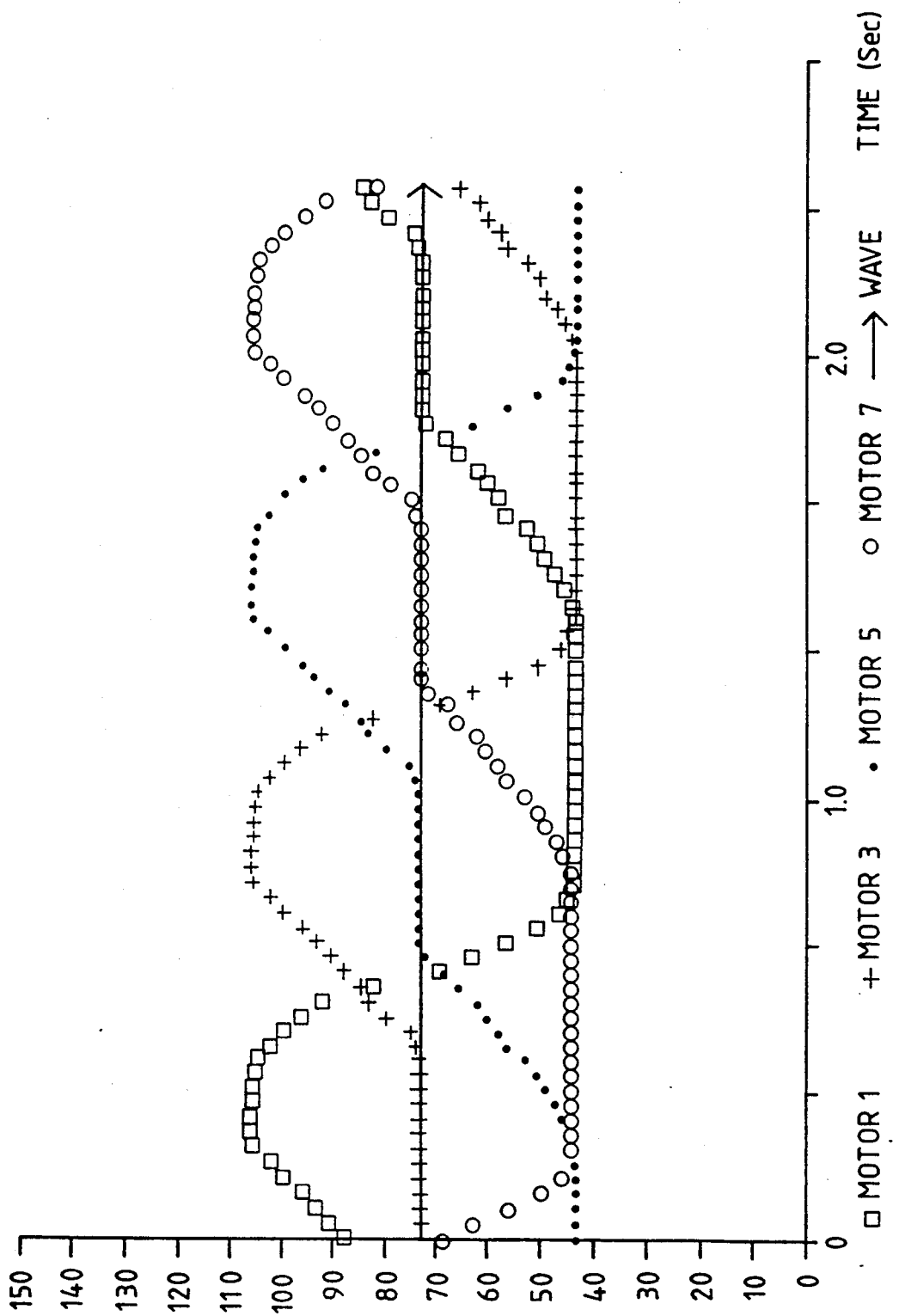
FIG. 3 shows how the surface speed of individual rollers of an array varies with time.

In a preferred construction for arranging circular articles with a diameter of 45 millimeters, the conveyor comprises 32 individually driven rollers having a diameter of 14 millimeters mounted 20 millimeters apart. Eight signals for controlling the rates of rotation of the rollers are generated by means of appropriate control equipment, which preferably controlled by means of a computer or a programmable logic controller. The signals generated and transmitted to alternate ones of a group of eight adjacent rollers are shown in FIG. 3, and the resulting profile of rate of rotation across part of the array of rollers 5 is shown in FIG. 2.

Figure 4:
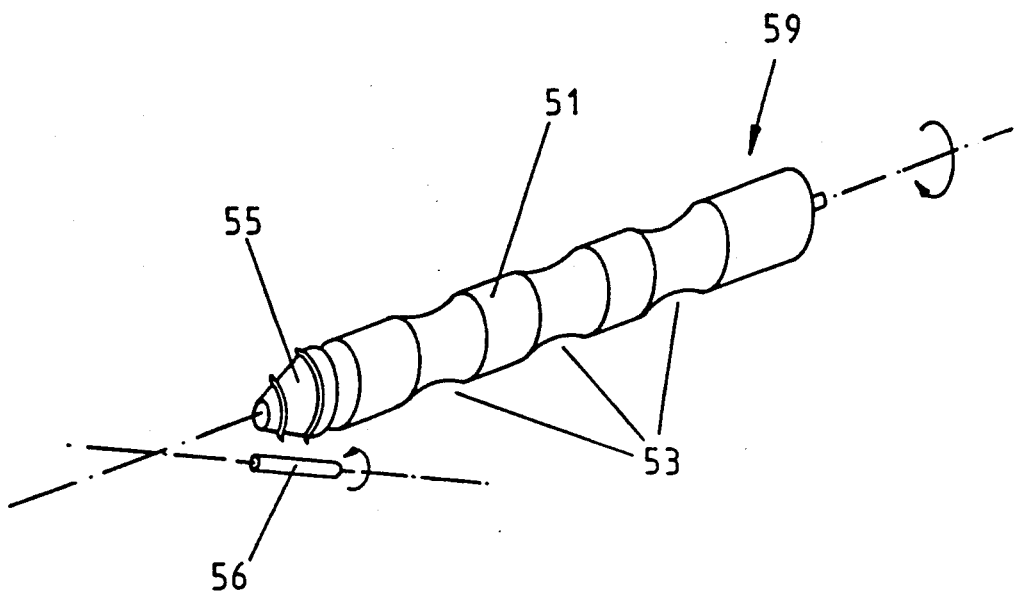
FIG. 4 is an isometric view of a preferred construction of roller.

FIG. 4 shows a preferred roller. The roller 59 comprises a profiled portion 51 in which the diameter of the roller varies along its length to define reduced diameter positions 53. A conveyor such as that shown in FIG. 1 Which incorporates rollers of the type shown in FIG. 4 will tend to align articles at the reduced diameter portions of the rollers, thus creating a two dimensional array of regularly spaced articles.

The roller further includes a drive portion 55 which is tapered. The drive portion is formed from a polished material such as polished stainless steel.

A support roller 56 may be provided having its surface extending parallel to the relevant surface of the drive portion 55 which is contacted by the belt when the conveyor is in use. The support roller helps to force the belt against the drive portion of the roller.

Figure 5:
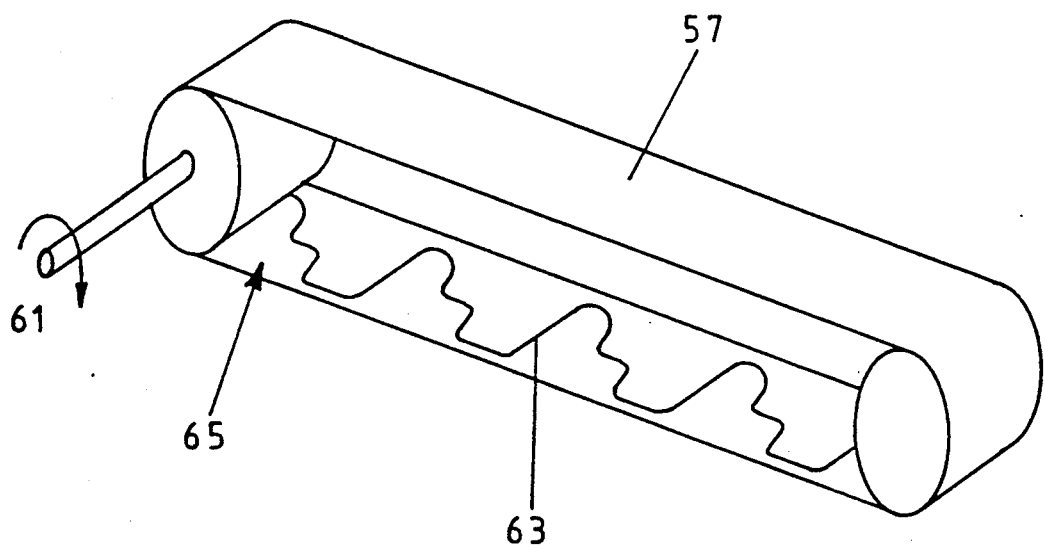
FIG. 5 is an isometric view of a belt drive for imparting rotational movement to the roller shown in FIG. 4.

FIG. 5 shows a belt 57 which can be used to drive the roller 59 shown in FIG. 4, from a constant speed electric motor 61. The belt 57 may usefully be formed from a material which allows it to stretch differentially across its width. The belt is provided with an embossed trail 63 of a tacky material such as silicone rubber. As the belt rotates due to the motor 61, the drive portion 55 of the roller 59 is contacted by the embossed trail 63 of the belt at different points along its length. The effective diameter of the roller at the point at which it is contacted by the embossed trail therefore varies as the belt moves. When the embossed trail contacts a large diameter portion of the roller, the rate of rotation of the roller will be relatively low. When the embossed trail contacts a small diametere portion of the roller, the rate of rotation of the roller will be relatively high.

In FIG. 5, the embossed trail 63 is shown provided on the internal surface 65 of the belt 57. In some situations, it can be preferred to provide the trail on the external surface of a belt.

I claim:

1. A conveyor for arranging articles, having an infeed end at which articles may be placed on the conveyor and an outfeed end from which articles may be removed from the conveyor, the conveyor comprising:
   (a) a plurality of rollers arranged side-by-side;
   (b) means for rotating the rollers so that each roller can be rotated at a rate which is different from the rate of rotation of adjacent rollers; and
   (c) means for controlling the rates at which the rollers rotate so that a high rotational rate region of the conveyor, in which one or more rollers rotate at a higher rate than adjacent rollers, moves from a first end of the conveyor towards a second end.

2. A conveyor as claimed in claim 1, in which the rate of rotation of each roller varies cyclically with time.

3. A conveyor as claimed in claim 2, in which the rate of rotation of each roller varies between rates above and below a mean rate approximately sinusoidally.

4. A conveyor as claimed in claim 3, in which the rate of rotation of each roller is held at a fixed rate for a portion of the rotation cycle.

5. A conveyor as claimed in claim 1, in which the pattern of cyclical variation of the rotation rate of any of the rollers is approximately the same as the pattern of cyclical variation of rotation rates of the other rollers, the cycles for adjacent rollers being out of phase.

6. A conveyor as claimed in claim 2, in which the pattern of cyclical variation of the rotation rate of at least one of the rollers is different from the pattern of cyclical variation of one or more of the other rollers.

7. A conveyor as claimed in claim 1, in which at least one of the rollers has a non-uniform cross-section along its length.

8. A conveyor as claimed in claim 1, in which independent rotation means are provided for each of the rollers.

9. A conveyor as claimed in claim 1, in which a single rotation means is provided for two or more rollers which are spaced apart along the conveyor.

10. A conveyor as claimed in claim 1, in which at least some of the rollers are cushioned.

11. A conveyor as claimed in claim 1, which includes a sheet-like surface along which the articles move, the surface having openings in it through which the rollers protrude, so that articles on the surface can be contacted by the rollers.

12. A method of arranging articles, which comprises:
 (a) placing the articles on a conveyor at its infeed end, the conveyor comprising:
  (i) a plurality of rollers arranged side-by-side, the spacing between the rollers being such that an article on the conveyor contacts at least two rollers.
  (ii) means for rotating the rollers so that each roller can be rotated at a different rate from rollers adjacent to it, and
  (iii) means for controlling the rates at which the rollers rotate so that high rotational rate region of the conveyor, in which one or more rollers rotate at a higher rate than adjacent rollers, moves from a first end of the conveyor towards the second end; and
 (b) removing the arranged articles from the outfeed end of the conveyor.

13. A method as claimed in claim 12, in which the length of the articles is greater than about twice the centre-to-centre spacing of the rollers.

14. A method as claimed in claim 1, in which the conveyor has more than one region in which rollers rotate at a relatively high rate, the distance between such regions being greater than about twice the length of the articles.

* * * * *